US007620496B2

(12) United States Patent
Rasmussen

(10) Patent No.: US 7,620,496 B2
(45) Date of Patent: Nov. 17, 2009

(54) COMBINED MAP SCALE AND MEASURING TOOL

(75) Inventor: Jens Eilstrup Rasmussen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 681 days.

(21) Appl. No.: 11/181,016

(22) Filed: Jul. 12, 2005

(65) Prior Publication Data

US 2006/0206264 A1 Sep. 14, 2006

Related U.S. Application Data

(63) Continuation-in-part of application No. 11/051,534, filed on Feb. 5, 2005, now Pat. No. 7,158,878.

(60) Provisional application No. 60/567,946, filed on May 3, 2004, provisional application No. 60/555,501, filed on Mar. 23, 2004.

(51) Int. Cl.
*G01C 21/30* (2006.01)
(52) U.S. Cl. .................. 701/212; 701/208; 340/995.14
(58) Field of Classification Search ......... 701/200–213; 340/995.1–995.28
See application file for complete search history.

(56) References Cited

U.S. PATENT DOCUMENTS

| 5,051,928 | A |   | 9/1991 | Gruters |
| 5,559,707 | A |   | 9/1996 | DeLorme et al. |
| 5,613,051 | A |   | 3/1997 | Iodice et al. |
| 5,646,751 | A |   | 7/1997 | Motamed et al. |
| 5,760,783 | A |   | 6/1998 | Migdal et al. |
| 5,802,492 | A |   | 9/1998 | DeLorme et al. |
| 5,910,805 | A |   | 6/1999 | Hickey et al. |
| 5,938,709 | A | * | 8/1999 | Hale et al. ................... 701/50 |
| 6,002,809 | A |   | 12/1999 | Feig et al. |
| 6,031,963 | A |   | 2/2000 | Kitamura et al. |
| 6,054,990 | A |   | 4/2000 | Tran |

(Continued)

FOREIGN PATENT DOCUMENTS

CA          2169421          11/1996

OTHER PUBLICATIONS

Canadian Office Action, Canadian Patent Application No. 2,560,560, Feb. 5, 2008, 3 pages.

(Continued)

*Primary Examiner*—Richard M. Camby
(74) *Attorney, Agent, or Firm*—Fenwick & West LLP

(57) ABSTRACT

A combined map scale and measuring tool can be used in digital mapping systems. In the scale mode, the scale indicates the correct scale, for example, at the center of the map. It can be updated with every pan, zoom or resize operation the user performs, and can further update to compensate for map distortion caused by the map projection. The tool mode is entered once the user drags one or both of the scale endpoints onto the map. The distance between two endpoints of the tool can be displayed. A new point can be added each time the user drags a line between existing endpoints of the tool. Info windows can be opened that include relevant information about the endpoints (e.g., latitude/longitude, geo code), and provide option to convert the tool segments to driving directions. A drag and drop location marker is also provided.

65 Claims, 9 Drawing Sheets

U.S. PATENT DOCUMENTS

| | | | |
|---|---|---|---|
| 6,100,897 | A | 8/2000 | Mayer et al. |
| 6,111,583 | A | 8/2000 | Yaron et al. |
| 6,144,338 | A | 11/2000 | Davies |
| 6,202,026 | B1 | 3/2001 | Nimura |
| 6,247,019 | B1 | 6/2001 | Davies |
| 6,252,608 | B1 | 6/2001 | Snyder et al. |
| 6,262,741 | B1 | 7/2001 | Davies |
| 6,307,573 | B1 | 10/2001 | Barros |
| 6,321,158 | B1 | 11/2001 | DeLorme et al. |
| 6,346,938 | B1 | 2/2002 | Chan et al. |
| 6,388,684 | B1 | 5/2002 | Iwamura |
| 6,421,053 | B1 | 7/2002 | Johns et al. |
| 6,473,691 | B1 | 10/2002 | Winter et al. |
| 6,496,189 | B1 | 12/2002 | Yaron et al. |
| 6,538,656 | B1 | 3/2003 | Cheung et al. |
| 6,573,905 | B1 | 6/2003 | MacInnis et al. |
| 6,724,382 | B2 | 4/2004 | Kenyon et al. |
| 7,050,068 | B1 | 5/2006 | Bastos et al. |
| 7,081,902 | B1 | 7/2006 | Crow et al. |
| 7,222,306 | B2 | 5/2007 | Kaasila et al. |
| 2002/0067353 | A1 | 6/2002 | Kenyon et al. |
| 2002/0067374 | A1 | 6/2002 | Kenyon |
| 2002/0067379 | A1 | 6/2002 | Kenyon et al. |
| 2002/0163654 | A1 | 11/2002 | Levantovsky |
| 2003/0095135 | A1 | 5/2003 | Kaasila et al. |
| 2004/0075660 | A1 | 4/2004 | Liao et al. |
| 2004/0145599 | A1 | 7/2004 | Taoka et al. |
| 2005/0122294 | A1 | 6/2005 | Ben-David et al. |
| 2005/0286493 | A1 | 12/2005 | Angelhag |
| 2006/0017562 | A1 | 1/2006 | Bachelder |
| 2006/0041375 | A1 | 2/2006 | Witmer et al. |
| 2006/0075442 | A1 | 4/2006 | Meadow |
| 2006/0200383 | A1 | 9/2006 | Arutunian et al. |
| 2006/0241859 | A1 | 10/2006 | Kimchi et al. |
| 2006/0271286 | A1 | 11/2006 | Rosenberg |
| 2007/0011145 | A1 | 1/2007 | Snyder |
| 2007/0154067 | A1 | 7/2007 | Laumeyer et al. |
| 2007/0198182 | A1 | 8/2007 | Singh |

OTHER PUBLICATIONS

Canadian Office Action, Canadian Patent Application No. 2,560,386, Oct. 29, 2007, 3 pages.

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US05/09538, Sep. 20, 2007, 7 pages.

Cosman, M., "Global Terrain Texture: Lowering the Cost," Proceedings of the 1994 Image VII Conference, Tempe, Arizona: The Image Society, pp. 53-64.

Crawford, C., et al., Fast 3D Visualization of Large Image Datasets in a GIS, Earth Observation Magazine, vol. 12, No. 9, Dec. 2003, USA, pp. 1-5.

Dragan, R. V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

ESRI Video Clips—Demos—What is GIS?, ESRI GIS and Mapping Software, Mar. 31, 2006, [online] [Retrieved on Mar. 31, 2006] Retrieved from the InternetURL:http://gis2.esri.com/esriclips/clip.cfm?ClipID=60.

Gleicher, M. et al., "Through-the-Lens Camera Control," Proceedings SIGGRAPH '92, Computer Graphics, Jul. 1992, pp. 331-340, vol. 26, No. 2.

Ho, T. K., et al., "Word Recognition with Multi-Level Contextual Knowledge," Center for Document Analysis and Recognition, State University of New York at Buffalo, pp. 1-11, Buffalo, New York.

Leclerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Montalbano, E., Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: http://maps.msn.com/(ogxuearj4ya5au55fogcdzbt)/Home.aspx.

MSN Virtual Earth—Microsoft Internet Explorer, [online], [retrieved on Aug. 1, 2005]. Retrieved from the Internet URL:http://virtualearth.msn.com, pp. 1-3.

MSN Virtual Earth To Take on Google Earth, [online], [retrieved on Aug. 1, 2005]. Retrieved from the Internet <URL: http://blog.searchenginewatch.com/blog/050523-125208>, pp. 1-4.

MultiMap.com—Online Maps Everywhere, [online], [retrieved on Aug. 1, 2005]. Retrieved from the Internet <URL: http://multimaps.com>.

NASA World Wind, [online], [retrieved on Aug. 1, 2005]. Retrieved from the Internet <URL:http://worldwind.arc.nasa.gov/>, pp. 1-2.

Rabinovich, B., et al., "Visualization of Large Terrains in Resource-Limited Computing Environments," Proceedings of the 8th IEEE Visualization '97 Conference, Oct. 19-24, 1997, pp. 95-102, Phoenix, Arizona.

TerraServer-USA, [online], [retrieved on Aug. 1, 2005]. Retrieved from the Internet <URL: http://terraserver.homeadvisor.msn.com/>.

whereis.com—Search Australian Maps, [online], [retrieved on Aug. 1, 2005]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

Supplemental European Search Report, European Patent Application No. 05726046.5, Nov. 6, 2008, 3 Pages.

* cited by examiner

COMBINED MAP SCALE AND MEASURING TOOL

RELATED APPLICATIONS

This application is a continuation-in-part of U.S. application Ser. No. 11/051,534, filed Feb. 5, 2005 now U.S. Pat. No. 7,158,878, titled "A Digital Mapping System", which claims the benefit of U.S. Provisional Application Nos. 60/567,946, filed May 3, 2004, and 60/555,501, filed Mar. 23, 2004. In addition, this application is related to U.S. application Ser. No. 11/088,542, filed Mar. 23, 2005, titled "Generating and Serving Tiles in a Digital Mapping System". Each of these applications is herein incorporated in its entirety by reference.

FIELD OF THE INVENTION

The invention relates to digital mapping systems, and more particularly, to techniques that provide more accurate and useful map scales.

BACKGROUND OF THE INVENTION

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a Web user asks for a new map view (e.g., by entering a postal address, or by clicking a navigation link next to a current map view), the user's Web browser sends to a Web server a request indicating the boundaries of the new map view. The Web server in turn extracts the corresponding vector-based map data from a database, and draws a bitmap image of the map. The server then converts the bitmap to an image format supported by the user's Web browser and returns the image, sometimes embedded in HTML, to the user's Web browser so that it can be displayed. Other map Web sites, such as Britain's MultiMaps or Australia's Wherels utilize a raster-based map database instead. In these cases, it is not necessary to extract vectors and draw a map image. Rather, these functions are replaced by simply extracting the appropriate part of a larger, pre-rendered image.

Whether vector-based or raster-based, such existing map systems typically have a scale either on or next to the map image. A map scale generally indicates the relationship between a certain distance on the map and the corresponding distance on the ground, and can be used to help the user of the map approximate actual distances covered by the map. The scale is normally generated on the server side, and is embedded in the map image served to the client. In this way, the scale is updated when a new map image is loaded.

A scale is typically provided in one of two ways: a written scale or a graphic scale. A written scale gives a description of scale in words (e.g., "one inch equals one mile"). Note that such a scale would be ineffective, however, if the map is zoomed or otherwise reproduced at a size different than the original map size to which the written scale was directed. Thus, if a user attempts to measure an inch on a modified version of the map, incorrect distance information will be obtained. Moreover, users are required to provide their own device for measuring distances on the map.

A graphic scale generally solves some of the problems associated with written scales. A graphical scale is usually depicted as a horizontal line and a corresponding distance (e.g., miles, yards, feet) which that line represents on the map. The corresponding distance can be placed in the middle of the line, or at the end of the line. Some maps provide multiple lines to provide scales in more than one unit of distance, such as one line for miles and another line for kilometers. However, such conventional graphic map scales are also associated with a number of problems.

For instance, some graphical scales are not always updated with panning and zoom or resize operations performed by the user. This is of particular concern when the scale image is separate from the map image. Moreover, note that at various zoomed out levels, the scale ratio of the top portion of the shown map can be different than the scale ratio of the bottom portion of the shown map, depending on the map projection used. In addition, conventional graphical scales require a user to provide his/her own device for measuring distances on the map, and relating that device to the distances shown on the graphical scale.

What is needed, therefore, are digital mapping techniques that provide more accurate and useful map scales.

SUMMARY OF THE INVENTION

One embodiment of the present invention provides a computer implemented method for adjusting and using a graphical map scale of a digital map provided by a digital mapping system. In response to the digital map being moved or zoomed, the method includes updating the scale as necessary. In response to the scale being moved on the digital map, the method includes switching from a scale mode to a measuring tool mode. The method may further include the preliminary step of receiving information that influences the scale behavior, including information about at least one of scale position on the map and zoom level. The information that influences the scale behavior may identify a map projection used in making the digital map. The information that influences the scale behavior may include information about user preferences, including at least one of desired scale units and desired scale distance. Updating the scale as necessary may include drawing the scale so each unit is a correct number of pixels wide (e.g., based on scale units and scale distance), and adding the scale distance to the scale as text. Updating the scale as necessary may include drawing the scale so each unit is a correct distance (e.g., based on map projection used and scale location on the digital map), and adding the distance to the scale as text. Switching from scale mode to measuring tool mode may include, for example, changing a graphical look of the scale to indicate measuring tool mode is active. The digital mapping system may include, for instance, a client side that requests map data from a server side, and the method is carried out on the client side.

In the scale mode, the method may include generating a tool tip in response to a user moving a cursor over the scale, thereby communicating availability of the measuring tool mode. In scale mode, the method may include at least one of opening an information window in response to a user selecting the scale, thereby allowing the user to specify units of measure for the scale, and opening an information window in response to a user selecting the scale, thereby showing the user information describing how to use the scale as a measuring tool to measure distances on the map. In the measuring tool mode, the method may include indicating a home position for the scale on or proximate the digital map. In response to a user selecting the home position, the method may further include returning from measuring tool mode to scale mode, and returning the scale to the home position. In the measuring tool mode, the method may include displaying a distance between locations marked by endpoints of the scale, the distance in units of the scale. In measuring tool mode, the method may include opening an information window in response to a user selecting the scale, thereby allowing the user to request driving directions for travel between locations marked by endpoints of the scale. The method may further include providing the driving directions. In measuring tool mode, the method may include opening an information window in response to a user selecting the scale, thereby showing the user information about points marked by the scale (such as latitude/longitude, geocode).

Another embodiment of the present invention provides a computer implemented method for adjusting and using a graphical map scale of a digital map provided by a digital mapping system. In response to the scale being moved on the digital map, this embodiment includes switching from a scale mode to a measuring tool mode, and displaying a distance between locations marked by endpoints of the scale, the distance in units of the scale. Switching from scale mode to measuring tool mode may include changing a graphical look of the scale to indicate measuring tool mode is active. The scale includes, for example, a line between two endpoints, and in measuring tool mode, the method includes drawing the scale to reflect its movement as the endpoints are moved to locations on the digital map. In one such case, drawing the scale to reflect its movement includes changing a graphical look of at least one of the endpoints of the scale to indicate its movement, and changing the graphical look of the at least one endpoint to indicate it has been released from movement. In another case where the scale includes a line between two endpoints, and in measuring tool mode, the method includes drawing an additional endpoint each time a user drags the line between two endpoints to a location on the map, thereby providing a multisegment line. In such a case, the method may include converting the multisegment line into at least one of written and graphical driving directions.

Another embodiment of the present invention provides a computer implemented method for adjusting and using a graphical map scale of a digital map provided by a digital mapping system. In response to the scale being moved on the digital map, this embodiment includes switching from a scale mode to a measuring tool mode, and drawing the scale to reflect its movement on the digital map, the scale including a line between two endpoints. The method further includes changing the graphical look of the scale to indicate it is no longer moving, and displaying a distance between locations marked by the endpoints of the scale, the distance in units of the scale. In measuring tool mode, the method may include opening an information window in response to a user selecting the scale, thereby allowing the user to request driving directions for travel between locations marked by endpoints of the scale. The method may further include providing the driving directions. In the measuring tool mode, the method may include drawing an additional endpoint each time a user drags the line between two endpoints to a location on the map, thereby providing a multisegment line. This multisegment line can, for example, trace a desired route. The method may further include opening an information window in response to a user selecting the scale, thereby showing the user information about points marked by the scale.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1A:
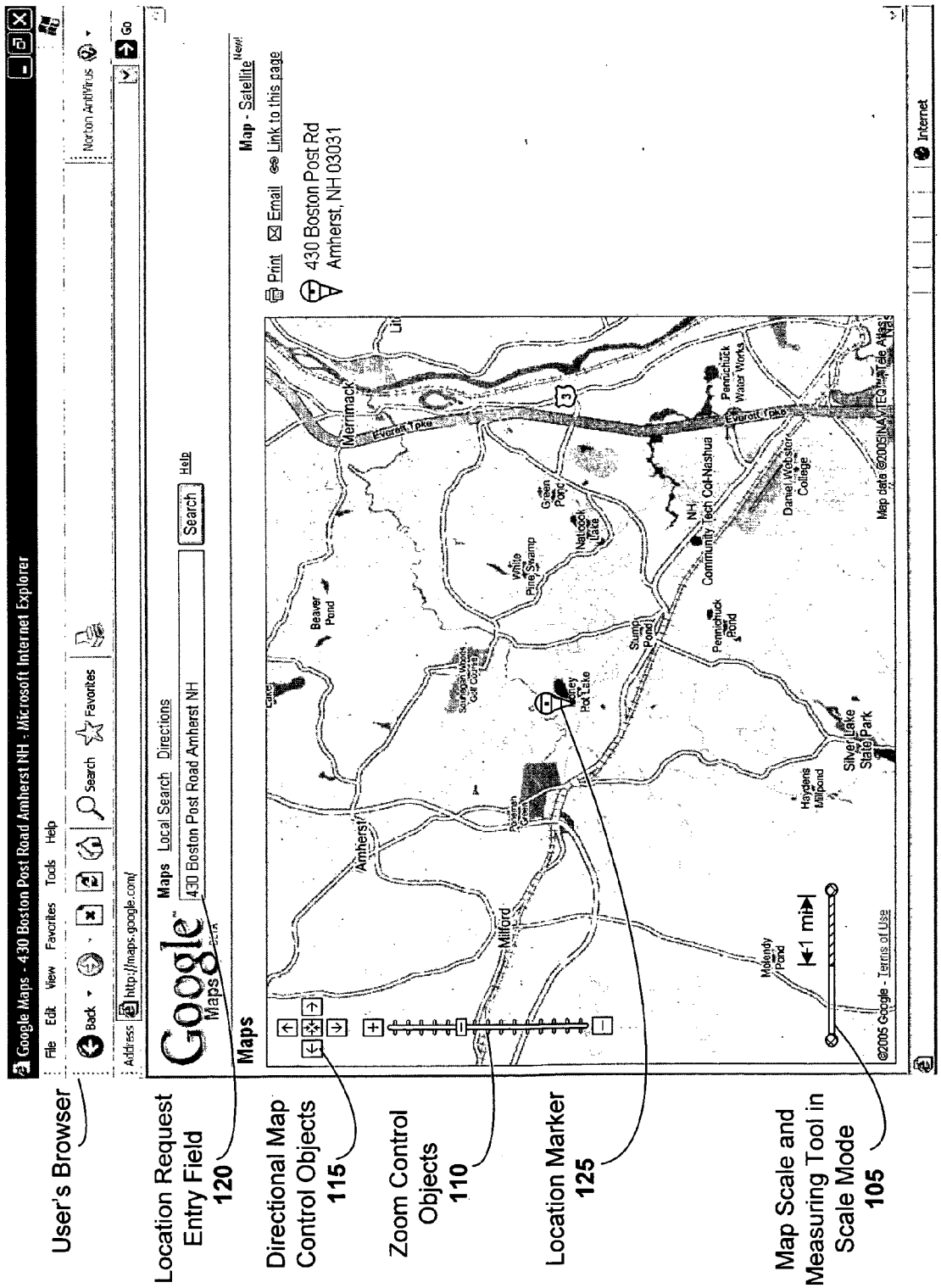
FIGS. 1a and 1b illustrate a combined scale and measuring tool that is currently in scale mode, in accordance with one embodiment of the present invention.

A combined map scale and measuring tool is disclosed herein that can be used in a digital mapping system. To provide added functionality to the scale without incurring undesirable processing delay, the scale is drawn on the client side. Thus, it can be quickly updated with every pan, zoom or resize operation the user performs. The user can also manipulate the scale to, for example, set its units and use it as a distance measuring tool. However, it is possible that the same functionality could be provided from the server side, but with processing delay.

Overview

The combined map scale and measuring tool has two general modes of operation: scale mode and tool mode: In the scale mode, the scale indicates the correct scale, for instance, at the center of the map, or at the position on the map that the scale occupies. In more detail, the scale varies at different points on the map view, depending on the map projection used. Thus, a tool tip can be used to indicate where the scale shown is valid (e.g., "Scale at center of map"). The user can determine where the scale is valid, if so desired (e.g., using a "set scale" configuration parameter). In any case, the scale is updated with every pan, zoom or resize operation the user performs. At zoomed out levels (e.g., showing map image of North America), the scale of the top and bottom of the shown map can vary greatly (depending on the map projection used) and is adjusted accordingly. The scale can be drawn, for example, as a line with one or more segments of different color, with text indicating the length of each segment, be it 1 mile, 100 feet or any other measure of distance. The scale can be configurable as well. For instance, if the user clicks on or otherwise selects the scale, a dialog box appears that allows the user to specify the desired scale units.

In addition, an element (e.g. colored circle) is added to each end of the line making up the scale. A tool tip can be used to show the user that these endpoints are dragable, and that the scale can be used as a measuring tool. The tool mode is entered once the user drags one of the scale endpoints. In one particular embodiment, once the user drags the endpoints, the look of the endpoints can be converted, for instance, to have the look of location markers (e.g., such as those shown in the previously incorporated U.S. application Ser. No. 11/051, 534). The line between the two endpoints of the measuring tool can be drawn at the client to look similar to the scale segments shown when in scale mode, if so desired. Alternatively, the line between the tool endpoints can be just a plain line.

The distance on the map between the two endpoints of the tool can be displayed (e.g., in a dialog box near one of the markers or in the middle of the line). The user can drag each endpoint repeatedly, to take multiple measurements between positions on the map. When the user clicks one of the tool endpoints, an info window can be opened that includes relevant information about the point (e.g., latitude/longitude, geo code) and distance information, as well as a link or button that allows the user to convert the straight line to driving directions. When the user select this option, driving directions are generated between the two endpoints. The directions can be shown, for example, instead of the measuring line.

When the combined scale and measuring tool is in tool mode, a default or home position of the scale (e.g., lower left corner of map) can be marked, for instance, using a dark or shaded outline. If the user clicks this outline, then the deployed measuring tool is returned to its home position and switched back to scale mode (including the associated look of the scale). This switch from tool mode to scale mode can also be done, for instance, if the user navigates too far from the location of the measuring tool, or after a preset time.

If the user drags a point on the line between the endpoints of the measuring tool (instead of the endpoints), then a new point can be added. For instance, assume the measuring tool currently has one straight line between two endpoints. If the user drags a point on the line between the endpoints, then a new point is added and the measuring tool now shows three points, and the two lines between them. An info window (or windows) can be used to show all distances. A new point can be added each time the user drags a point on the line instead of an endpoint of the tool. The user can then convert these multi-segment lines into driving directions, with directions through all the points. If the user drags an endpoint of the tool on top of an existing location marker, then that location marker can be highlighted (e.g., color change) to indicate that the tool endpoint is actually co-located with the location marker, without having to actually cover the marker with the endpoint. For instance, if an adjacent location marker is green, then the nearby tool endpoint is actually at the location marker position.

Scale Mode

Figure 1B:
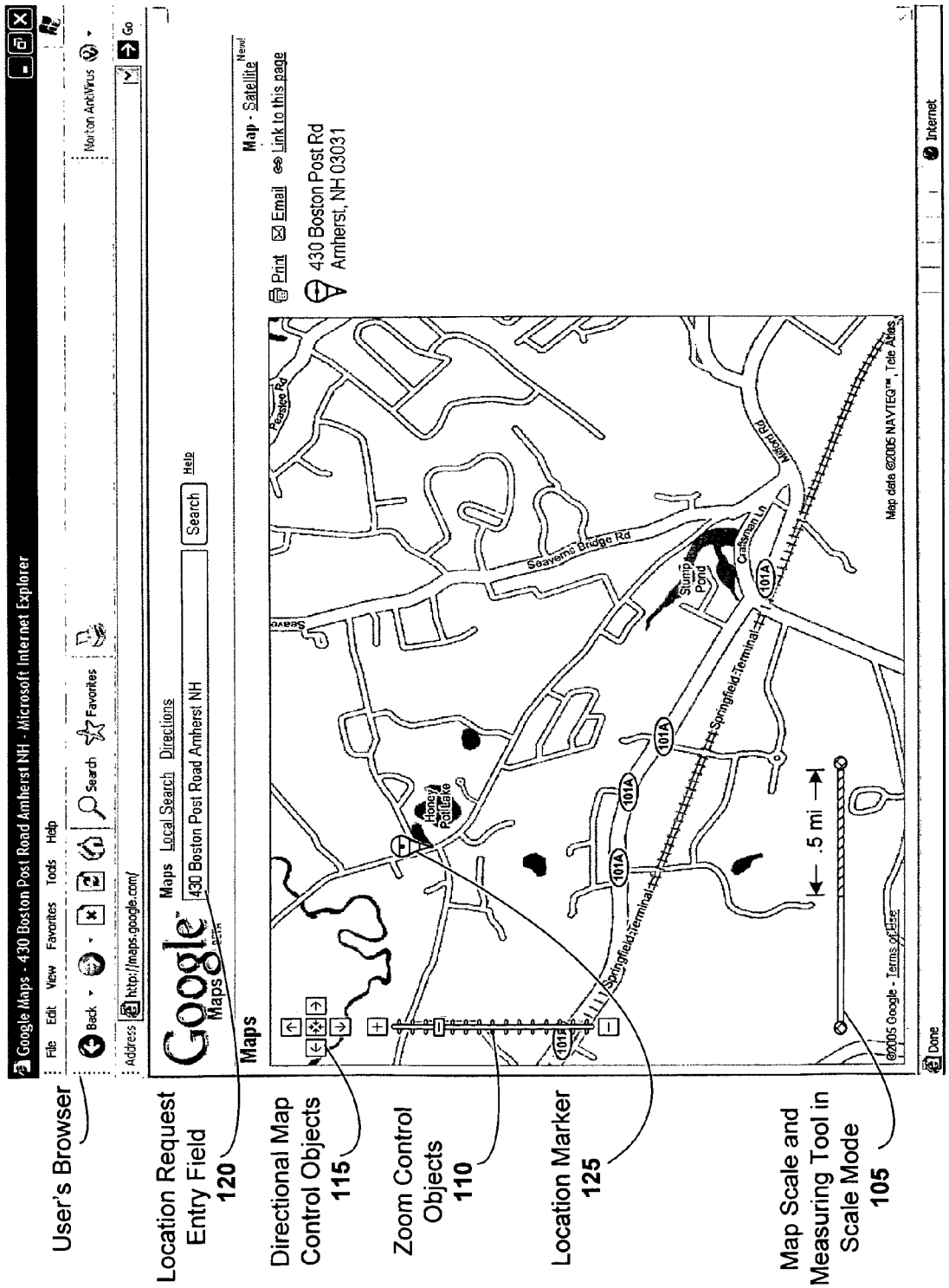

FIGS. 1a and 1b illustrate a combined scale and measuring tool configured in accordance with one embodiment of the present invention. As can be seen, a user has accessed a remote server of a digital mapping system through use of a browser, and requested a digital map for a specific address by typing that address into the location request entry field 120, and then clicking search. The requested map is displayed in the user's browser, and has a number of digital map features, including directional map control objects 115, zoom control objects 110, a location marker 125 (to highlight the requested address), and a combined map scale and measuring tool 105 (which is currently in scale mode).

Functionality and implementation details associated with the combined map scale and measuring tool 105 are discussed herein. Other features and functionality of the map, such as the zoom control objects 110, directional map control objects 115, location request entry field 120, location marker 125 (and associated information windows), high resolution printing, and the satellite imagery option are discussed in detail in the previously incorporated U.S. application Ser. Nos. 11/051,534 and 11/088,542, which describe tile-based mapping systems. Note, however, a combined map scale and measuring tool 105 configured in accordance with the principles of the present invention can also be used with other mapping systems, such as vector-based and raster-based mapping systems.

In the scale mode, the combined map scale and measuring tool 105 indicates the correct scale at the center of the map. Alternatively, the combined map scale and measuring tool 105 indicates the correct scale at the position on the map that the scale occupies. In any such case, the combined map scale and measuring tool 105 is updated with every pan, zoom, or resize operation the user performs. In one embodiment, this dynamic scale updating is carried out using a function (e.g., function UpdateScale). This function takes information about the map position and zoom level, as well as other data meant to influence the scale behavior (e.g., such as projection type). The function is called every time the map is moved or zoomed. Thus, the function is responsible for updating the scale on the map. The function can be called at the end of a map operation, such as a user dragging the map. Alternatively, the function can be called every time the map moves during the dragging operation. Whether post-navigation scale updating or real-time scale updating is used depends on the performance of the client (e.g., processing speed and browser configuration).

At zoomed out levels (e.g., showing map image of a continent or world map), the scale of the top and bottom portions of the shown map can vary greatly (depending on the map projection used) and is adjusted accordingly. In more detail, all map projections attempt to fit the curved surface of the Earth onto a flat medium. As such, the shape of the flat map is a distortion of the true layout of the Earth's surface. Mercator projection exaggerates the size (and to some extent, the shape) of map areas that are distant from the equator. For example, for maps made using Mercator projection, Greenland is typically shown to be as large as Africa. In reality, however, Africa is about 13 times that of Greenland.

Other cylindrical projections, as well as forms of equal-area projection can also be used, and the present invention is not intended to be limited to handling any one type of map projections. For instance, in maps made using the equal-area Gall-Peters projection, the shape, rather than the size of map areas is distorted. In particular, areas near the equator are stretched vertically, and areas far from the equator are squashed. Such manipulation of shape still impacts scale, just as with manipulations in size performed using Mercator projection. In any such cases, the combined map scale and measuring tool 105 can be configured to adjust in accordance with its position on the map and the type of map projection used.

In one such embodiment, a function (e.g., function UpdateScale) adjusts the scale based on the scale position on the map (e.g., latitude/longitude or geocode) and the projection type. A lookup table (LUT), such as the one shown in Table 1, can be provided for each projection type supported, where each table stores entries of scale information indexed by the distance of the scale position from the equator, which can be indicated, for instance, by latitude or a geocode. Alternatively, this functionality can be achieved using a formula, as will be apparent in light of this disclosure. Generally stated, for cylindrical projections, the scale for a given latitude is the same everywhere, regardless of longitude, assuming no change in zoom.

TABLE 1

Scale Adjustment LUT for Mercator Projection

| Scale Position | Scale Distance Multiplier |
|---|---|
| Latitude_1 | 1.0 |
| Latitude_2 | 0.9 |
| Latitude_3 | 0.8 |
| ... | ... |
| ... | ... |
| Latitude_N | M |

The resolution of the table can vary from application to application, depending on desired degree of accuracy. For applications requiring high accuracy, the table can have an entry, for example, for every 100 to 500 miles from the equator (in both the northern and southern directions), while lesser demanding applications can have an entry for every 500 to 1000 miles from the equator. In the example of Table 1, assume the entries range from locations of northerly increasing latitude, beginning with latitudes proximate the equator (Latitude_1) and ending at latitudes proximate the north pole (Latitude_N). A similar set of N latitudes can be used for map areas between the equator and south pole.

For Mercator projection, the distance covered by the same scale length decreases as the distance from the equator increases (e.g., as indicated by latitude). For instance, a 100 pixel scale at Latitude_1 could represent 100 miles. That same 100 pixel scale at Latitude_3 would represent 80 miles, and at Latitude_N would represent M*100 miles (e.g., 10 miles, assuming M=0.1). Numerous scale adjustment schemes are possible, depending on factors such as the desired resolution, scale accuracy, and map projection type used, and the present invention is not intended to be limited to any one such embodiment.

For example, the scale length need not be constant, and can be calculated for each scale update, based on a desired scale distance, such as 1 mile, 2 miles, 5 miles, or other nicely rounded scale distance. In this sense, it may be more important that the scale distance be a rounded number than the scale length, which can be an arbitrary or non-rounded number (e.g., where a scale length of 1.236 inches equals a scale distance of 5.0 miles).

The position of the map can be defined by the center of the map, or at the actual position of the scale. As will be apparent in light of this disclosure, defining the position of the map at the actual position of the scale can make a significant difference in processing, such as when zoomed out, for instance, to view a world map using the Mercator projection. Also, note that each zoom level provided by the mapping system (if any) can have its own set of scale multipliers for a given range of latitudes. Alternatively, the same set of scale multipliers for a given range of latitudes can be applied to each zoom level, assuming a linear relationship between the zoom levels and the scale multipliers.

As previously stated, it may be more desirable to have a scale distance that is a rounded number. In such cases, the corresponding scale length can be a non-rounded number. In one such case, a lookup table including zoom levels and corresponding scale distances can be used, as shown in Table 2. In this example embodiment, each zoom level has two or more possible scale distances that can be used. Thus, the user can specify a preference, if so desired. A calculation can be performed to determine if a particular scale distance is appropriate for a given map, based on corresponding scale distance tolerances. Note that although the tolerances are shown as a percentage, they can be in any form (e.g., ±/−100 pixels).

TABLE 2

Scale Adjustment LUT for Scale Length Per Zoom Level

| Zoom Level | Available Scale Distances | Scale Distance Tolerance |
|---|---|---|
| 1 (zoomed in) | 0.5 mile | +/−10% |
| 1 | 1.0 mile | +/−10% |
| 2 | 1.0 mile | +/−10% |
| 2 | 2.0 mile | +/−10% |
| 3 | 2.0 mile | +/−10% |
| 3 | 5.0 miles | +/−5% |
| 3 | 10.0 miles | +/−5% |
| 4 | 10.0 miles | +/−5% |
| ... | ... | ... |
| 10 (zoomed out) | 100.0 miles | +/−2% |

In the example embodiment shown in FIGS. 1a and 1b, the map scale and measuring tool 105 (which is in scale mode) is initially about one inch in length, where each half inch unit of the scale 105 length is 1 mile on the displayed map. In this particular embodiment, there are fifteen zoom levels, and the current scale 105 of FIG. 1a is shown at zoom level 6. In FIG. 1b, the zoom level has been increased to level 4, and the scale 105 is now about one and three-quarter inches in length, where each 0.875 inches represents 0.5 miles on the displayed map. Numerous scale length/distance and zoom level schemes can be used.

In addition to information such as the map position, zoom level, and projection type, the scale function (e.g., function UpdateScale) can also include user preferences, such as choice of metric or imperial units, and latitude/longitude or degrees for display (e.g., for indicating location of scale). Other example information passed to the scale function includes a table of available scale lengths (e.g., 1 mile, 2 miles, 5 miles, 10 miles), information about the width (e.g., in pixels) of the map view, and the desired length of the scale (as well as minimum and maximum allowed lengths).

Pseudo code for an example scale function, called UpdateScale, is provided herein. This example function operates at the pixel level of the map image, and receives a number of parameters, including latitude/longitude (lat/lon) of scale location, current map zoom level (zoom), user preferred scale units (units), available scale lengths (lengths( )), and minimum, maximum, and user preferred scale widths (minWidth, maxWidth, and idealWidth). Other parameters and values can be passed to the function as well (e.g., projection type).

In this particular embodiment, the flow is as follows. Receive information that influences the scale behavior, such as information about map position, zoom level, projection, and user preferences. In response to the map being moved or zoomed, update scale accordingly by calling function, which: finds the width of one pixel; finds the scale length that is closest to the ideal length and within min and max; draws the scale so each unit is the correct number of pixels wide; and add the length to the scale as text. Here is the example pseudo code:

```
function UpdateScale(lat, lon, zoom, units, lengths( ), minWidth,
maxWidth, idealWidth)
    pixelWidth = pixelWidth( lat, lon, zoom, units) //Find the width of one
pixel.
    selectedLength = NIL    //Run through all lengths to find the one that is
                            closest to the ideal length and within min and
                            max.
    for each aLength in lengths( )
        lengthWidth = aLength / pixelWidth
        if ( lengthWidth <= maxWidth ) and ( lengthWidth >= minWidth)
        then
            if selectedLength == NIL then
                selectedLength = aLength
            else if Difference( Length, idealWidth ) <
            Difference(selectedLength, idealWidth ) then
                selectedLength = aLength
            end if
        end if
    next
        if selectedLength == NIL then
            Return error
        else
        //Draw scale so each unit is (selectedLength / pixelWidth) pixels wide
and add the length as text.
            ...
        end if
End function
```

This description of scale functionality and updating can be modified and refined to suit the particulars of a given application and desired scale performance. Numerous embodiments are possible, and the present invention is not intended to be limited to any one such configuration. Conventional scale drawing techniques, or those discussed in U.S. application Ser. No. 11/051,534 can be used to draw the scale, once the scale parameters (e.g., length, units) are known.

Measuring Tool Mode

Figure 2:
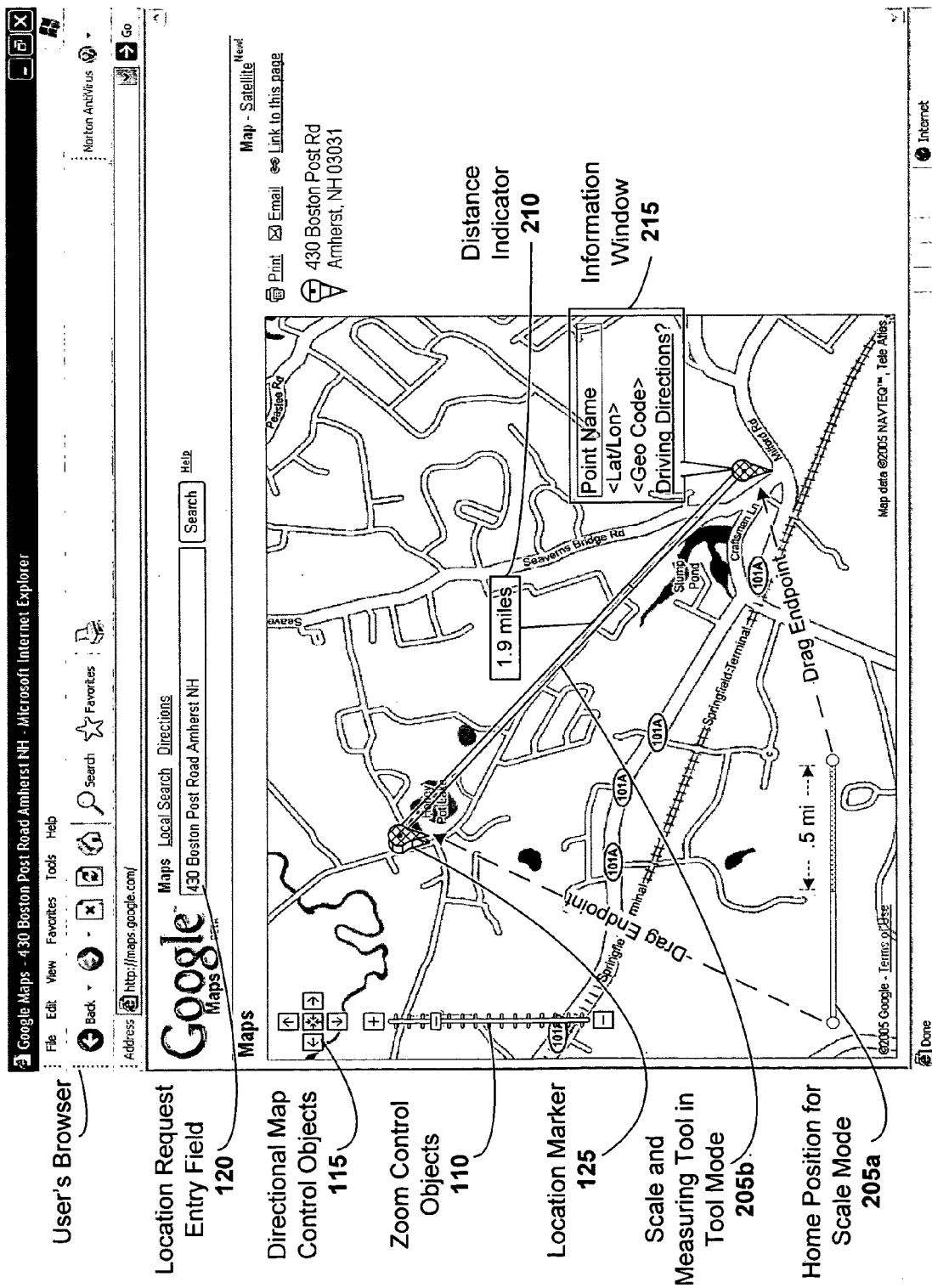
FIG. 2 illustrates a combined scale and measuring tool that is currently in tool mode and measuring the distance between two user selected points, in accordance with one embodiment of the present invention.

FIG. 2 illustrates a combined scale and measuring tool that is currently in tool mode and measuring the distance between two user selected points, in accordance with one embodiment of the present invention. Initially, the scale and measuring tool 205a is in its home position scale mode the normal mode, showing in this example how long one half mile is on the current map. As previously discussed, the scale 205a can be drawn on the map with distinct endpoints. When the user hovers over the scale or the endpoints, a tool tip appears, indicating, for instance, "Scale at map center. Drag endpoints to measure."

A number of user interface options are available. For example, if the user clicks the scale 205a, an info window (as described in the previously incorporated U.S. application Ser. No. 11/051,534) opens to show more detailed information, and includes links/options for changing the units of measure. If the user clicks one of the endpoints, an information window can open to show information describing how to drag the endpoints to use the combined scale and measuring tool to measure distances on the map. Various user interface and help schemes can be implemented, using information windows as described in the previously incorporated U.S. application Ser. No. 11/051,534 and/or conventional technology (e.g., tool tips, etc.).

If the user drags one or both of the endpoints as shown in FIG. 2, the drawing of the scale/measuring tool changes to reflect the change of mode from scale 205a to the measuring tool 205b, and to make the endpoints have an appearance that matches their function of being attached to the map at a point. For instance, and as described in the previously incorporated U.S. application Ser. No. 11/051,534, each endpoint in tool mode can be drawn as a balloon or teardrop like marker having a point at the bottom, and casting a shadow on the map.

JavaScript code in the client can be used to make these changes by, for instance, replacing the images used in the drawing of the scale 205a with images used in the drawing of the tool 205b, changing the value of a variable that stores the current mode (e.g., scale mode or tool mode), and if desired removing the current content on the map, whether it is an address, a search result, or driving directions. In any case, once the user drags the scale endpoints onto the map, the scale/measuring tool is now in the measuring mode.

As can be seen, once the tool 205b is positioned on the map, the distance between the tool 205b endpoints is displayed in the current units of scale/measuring tool, as shown by distance indicator 210 (e.g., like an information window). This information can be provided at some position near one of the tool 205b endpoints or near or on the line between them. If the user clicks the tool 205b endpoints or the line between them, an information window (e.g., as described in the previously incorporated U.S. application Ser. No. 11/051,534) opens to show information about the map locations marked by the tool 205b endpoints, and the distance between them, and offers options for changing the units, returning the tool 205b to the scale mode, or converting the line between the points to driving directions between the same points. In this embodiment, an information window 215 is shown, and includes latitude/longitude and/or geocode information. The window also provides a dialog box for the user to enter a name of the point, if so desired. The window 215 also includes a link for driving directions, which could also be implemented as an icon, button, or other such user interface.

If the user clicks or otherwise selects the option of converting the tool 205b line to driving directions, then a request for driving directions between the two points is sent to the back-end of the mapping system, which returns the driving directions (e.g., as described in the previously incorporated U.S. application Ser. No. 11/051,534). When the driving directions are displayed, the scale/measuring tool can be returned to the scale mode and position 205a.

Note that a homing function can also be included in the scale/measuring tool. For instance, the home position for scale 205a can be marked by a shadow or outline of the normal look of the scale/measuring tool in the scale mode, as shown in the lower left corner of FIG. 2. In such an embodiment, once the user has gotten the distance information from the tool 205b, clicking the outline or shadow of the scale 205a will return the tool 205b to scale mode in the home position.

Figure 3A:
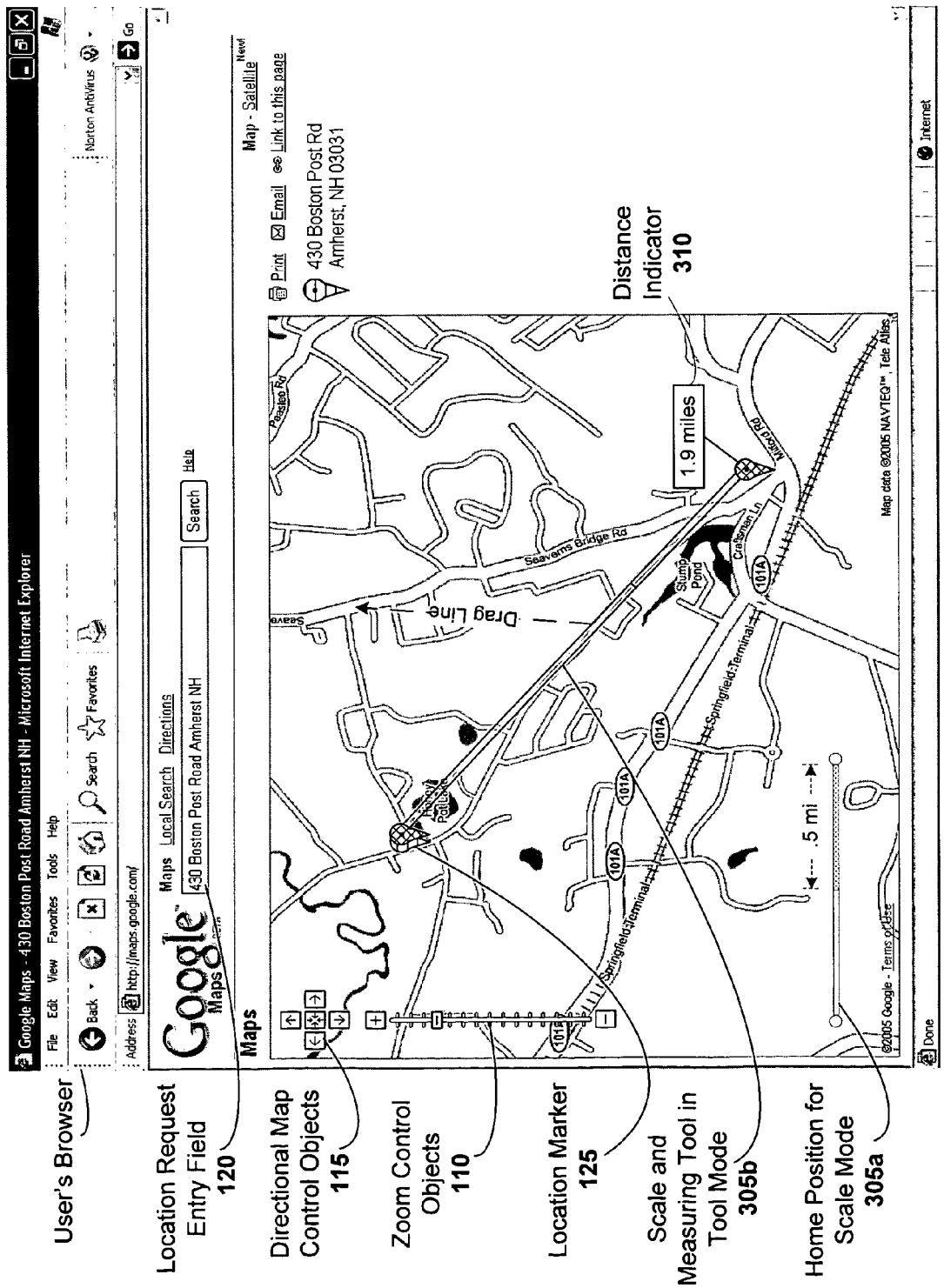
FIGS. 3a through 3c illustrate a combined scale and measuring tool that is currently in tool mode and measuring the distance between three user selected points, in accordance with one embodiment of the present invention.
Figure 3B:
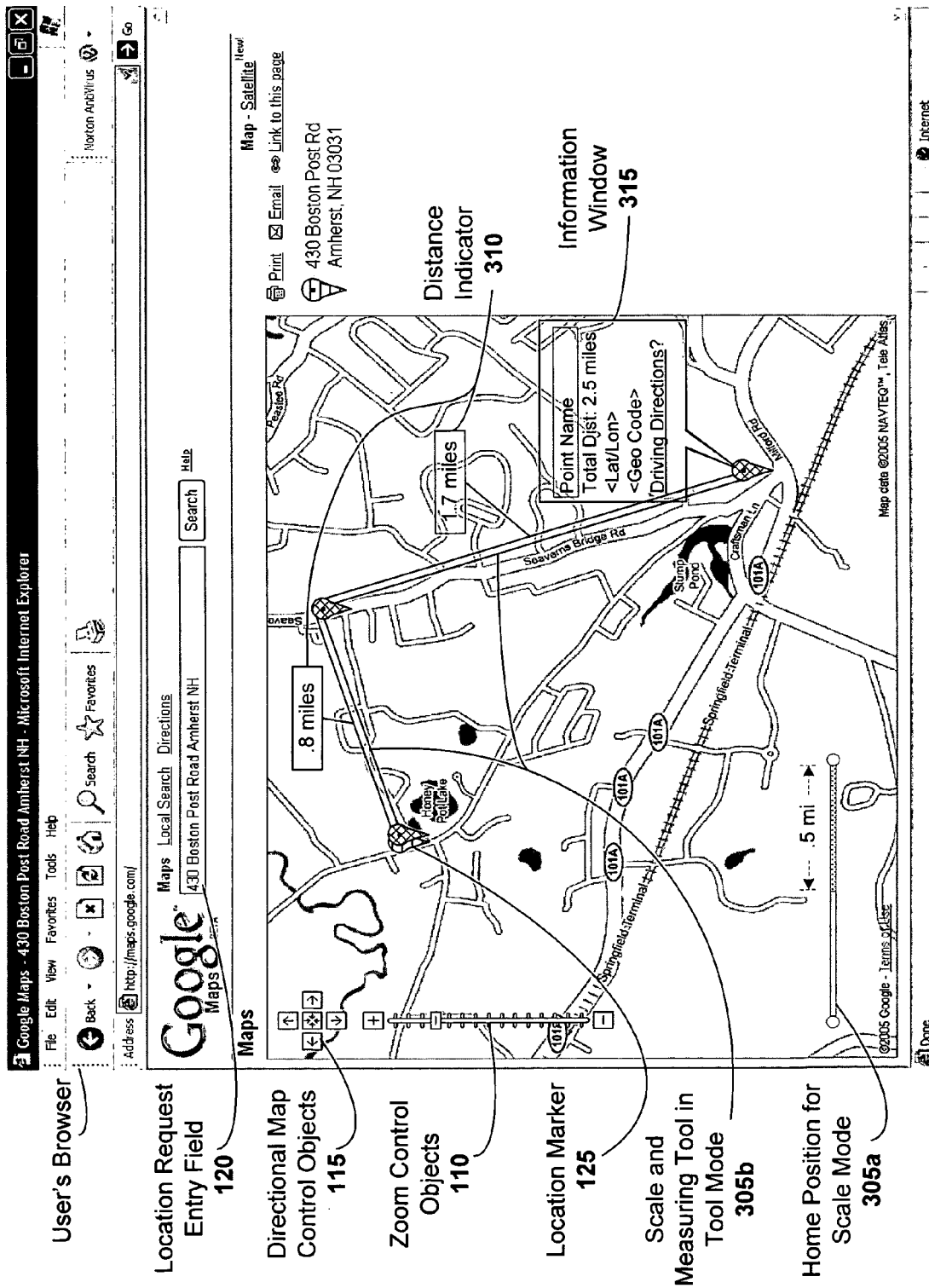
Figure 3C:
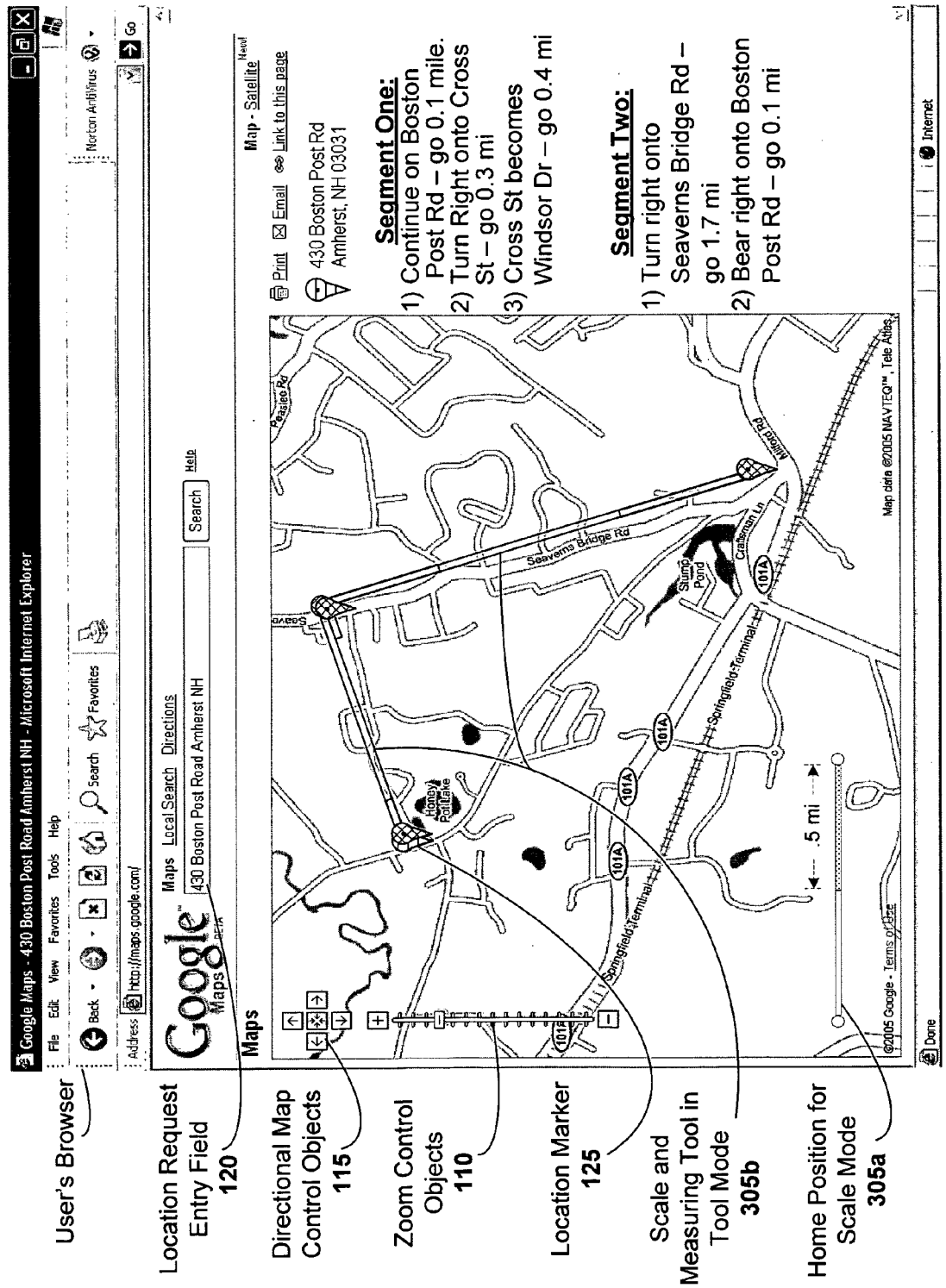

FIGS. 3a through 3c illustrate a combined scale and measuring tool that is currently in tool mode and measuring the distance between three user selected points, in accordance with one embodiment of the present invention. In this example case, the user has already dragged the endpoints of tool 305b onto the map. Then, the user drags an arbitrary point (as shown in FIG. 3a) on the line between the two endpoints of the tool 305b to a position on the map.

In response, the tool 305b adds a third point, so there are now two line segments, as shown in FIG. 3b. Distance indicators 310 are displayed for each line. When the user clicks on the lines or endpoints of tool 305b, an information window 315 opens to show the combined lengths (e.g., Total Dist. 2.5 miles). The information window 310 shown in this example embodiment also includes latitude/longitude and/or geocode information, and provides a dialog box for the user to enter a name of the point. Other information can be provided as well in the window 315, such as the length of each of the two lines and the positions of the points. The user can repeat this line dragging operation, creating an arbitrarily long line between the points created, and can also drag the individual points to new positions on the map. In one particular embodiment, when there are more than two points, an info window that opens when the user clicks tool 305b also has an icon, button, link or other interface allowing the user to remove a point on the line.

At the end, the user can convert the multiple segments to driving directions between the points created, and/or return the tool 305b to scale mode 305b, as previously described. FIG. 3c illustrates one embodiment where the user has chosen to convert the multiple segments to written driving directions (shown to the right of the map). As previously explained, the directions could also be graphically displayed (overlaid on map), in place of the measuring tool's 305b line. In another such embodiment, the driving directions can be provided in information windows, for example, that replace a portion of the measuring tool's 305b line. A button or link can also be included in the interface, for providing return driving directions using similar techniques, as will be apparent in light of this disclosure.

Drawing the scale/measuring tool in the scale mode can be accomplished similarly to the way the map controls are generated by combining bitmaps, except that some parts will be scaled horizontally (and for displaying degrees even vertically) to show the exact length of, for instance, one mile. In measuring tool mode, the scale/measuring tool endpoints can be similar to the location markers used to display and interact with map locations, as previously described and discussed in U.S. application Ser. No. 11/051,534. The line can be drawn, for example, using vector libraries supported by the browser, such as VML, SVG, or Canvas, or using plug-ins such as Flash. Other options for drawing lines would be to depend on a server side program that can deliver bitmaps with lines specified by the request, or the line can be marked by bitmaps in various ways that indicate the line's position.

In one embodiment, when dragging an endpoint of the scale/measuring tool, a JavaScript initiates the drag when the user clicks and drags the mouse beyond a pre-determined threshold, and illustrates the dragging by moving the marker with the user's movement of the input device (e.g., mouse/pointer). To illustrate that the endpoint of the scale/measuring tool is no longer attached to the map as it is dragged, the marker's image can be, for instance, moved up, and the shadow moved up and to the left, while the map location that the tool endpoint is over can be marked in various ways such as by an X or a small circle. When the user releases the mouse button, the marker drops down onto the marked position, the shadow moves back down and to the right, and the marking of the point (X or circle) is removed. While the drag goes on, the JavaScript can be configured to continually sort the layering of the markers and tool endpoints on the map, according to the latitude of their positions.

Instead of removing the existing data on the map (when in measuring tool mode), such as search results or driving directions, the client could be controlled to allow such data to co-exist, and even be replaced without affecting the mode of the scale/measuring tool. In such an embodiment, dragging an endpoint of the scale/measuring tool (in tool mode) on top of an existing location marker would highlight that location marker as long as the drag is on top of it. If the user drops the tool endpoint while a location marker is highlighted, the endpoint will be at the exact location of the highlighted marker, and retain its title and address if one is available.

In addition, a marker can be dragged onto the line of the scale/measuring tool, adding the location to the measuring, just as if the line had been dragged to the marker. Note that such a drag and drop marker could also be used on its own, to highlight specific points on a map. For instance, a user can drag the marker (e.g., which is normally stowed at some home position on or near the map, such as near the combined scale and measuring tool) onto a user selected location on the displayed map. The marker presents via an information window information about that location, such as geo code, latitude/longitude, and name. The name and/or other information can be entered (e.g., via a dialog box) by the user. User can then email the "marked-up" map, for instance, to a friend to show the marked location of a proposed meeting place.

Numerous applications are possible with a combined scale and measuring tool configured in accordance with an embodiment of the present invention. For instance, the user can drag an endpoint of the scale/measuring tool onto a position on the map, where the user lives. Then the user types in the address of the user's workplace, and performs a search for the address (e.g., as described in U.S. application Ser. No. 11/051,534). When the address is shown on the map, the user drags the second endpoint onto the marker at the work address. Now the scale/measuring tool is showing the distance between the user's home and work place. The user then pans the map so that it is centered on a point on the line, and searches, for instance, for coffee shops. When the search results show up as location markers on the map (e.g., as described in U.S. application Ser. No. 11/051,534), the user can drag from the line of the scale/measuring tool onto the marker for the preferred coffee shop, so there is three points in the scale/measuring tool (e.g., as shown in FIG. 3b). The user can then click on the tool to open an information window, and convert the lines to driving directions. The system then shows directions from the user's home to work going by the coffee shop of choice.

Digital Mapping System

Figure 4:
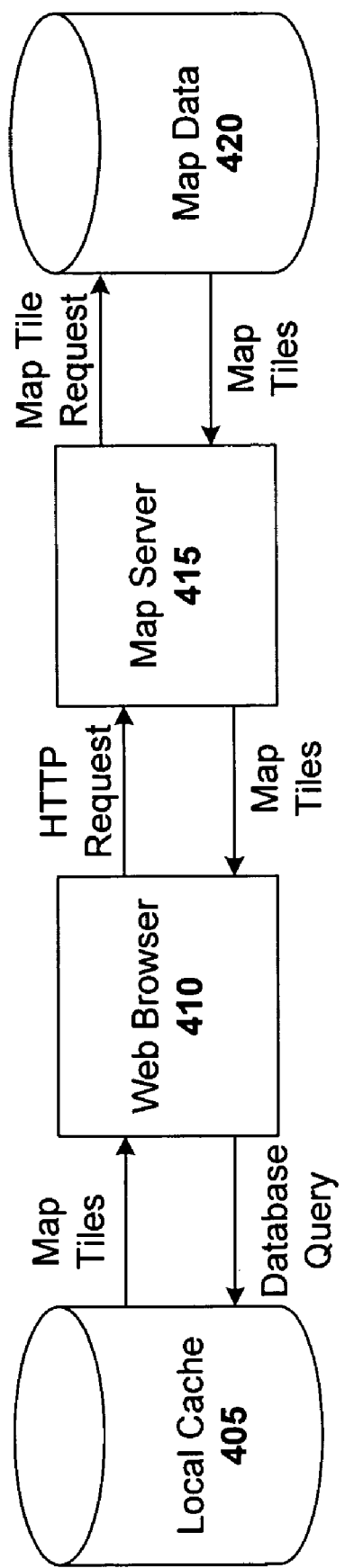
FIG. 4 is a block diagram of a digital mapping system that employs a combined scale and measuring tool, in accordance with one embodiment of the present invention.

FIG. 4 is a block diagram of a digital mapping system that employs a combined scale and measuring tool, in accordance with one embodiment of the present invention. As can be seen, the system includes a local cache 405, a web browser 410, a map server 415, and a map data database 420. This embodiment is based on the digital mapping systems described in the previously incorporated U.S. application Ser. Nos. 11/051,534 and 11/088,542. However, other mapping systems such as vector-based and raster-based mapping systems can also benefit from a combined scale and measuring tool as described herein.

In reference to FIG. 4, when a user requests a map or a new map view, the web browser 410 sends HTTP requests to map server 415 for map tiles needed in conjunction with the tiles already present in the web browser 410 (or in the web browser's cache 405) to produce the new map view. The map server 415 issues the corresponding map tile requests to map data 420 (e.g., which can be a database or file server). The requested map tiles from map data 420 are then returned to the web browser 410, via map server 415. The format of the tile requests can be structured in a manner that encourages the web browser 410 to cache the tiles on its local cache 405. By executing scripts as previously described in U.S. application Ser. Nos. 11/051,534 and 11/088,542, the web browser 410 then assembles the combined set of tiles into the requested map view for presentation to the user.

In addition to the scripts that assemble the map tiles to form the requested map view, the web browser 410 also executes scripts and function calls to enable and carryout the combined scale and measuring tool functionality, as described herein. Both scale mode and measuring tool mode can be implemented, for example, using JavaScript code and function calls as described herein. Other browser side programming tools can also be used as well to carry out the combined scale and measuring tool functionality.

Methodology

Figure 5:
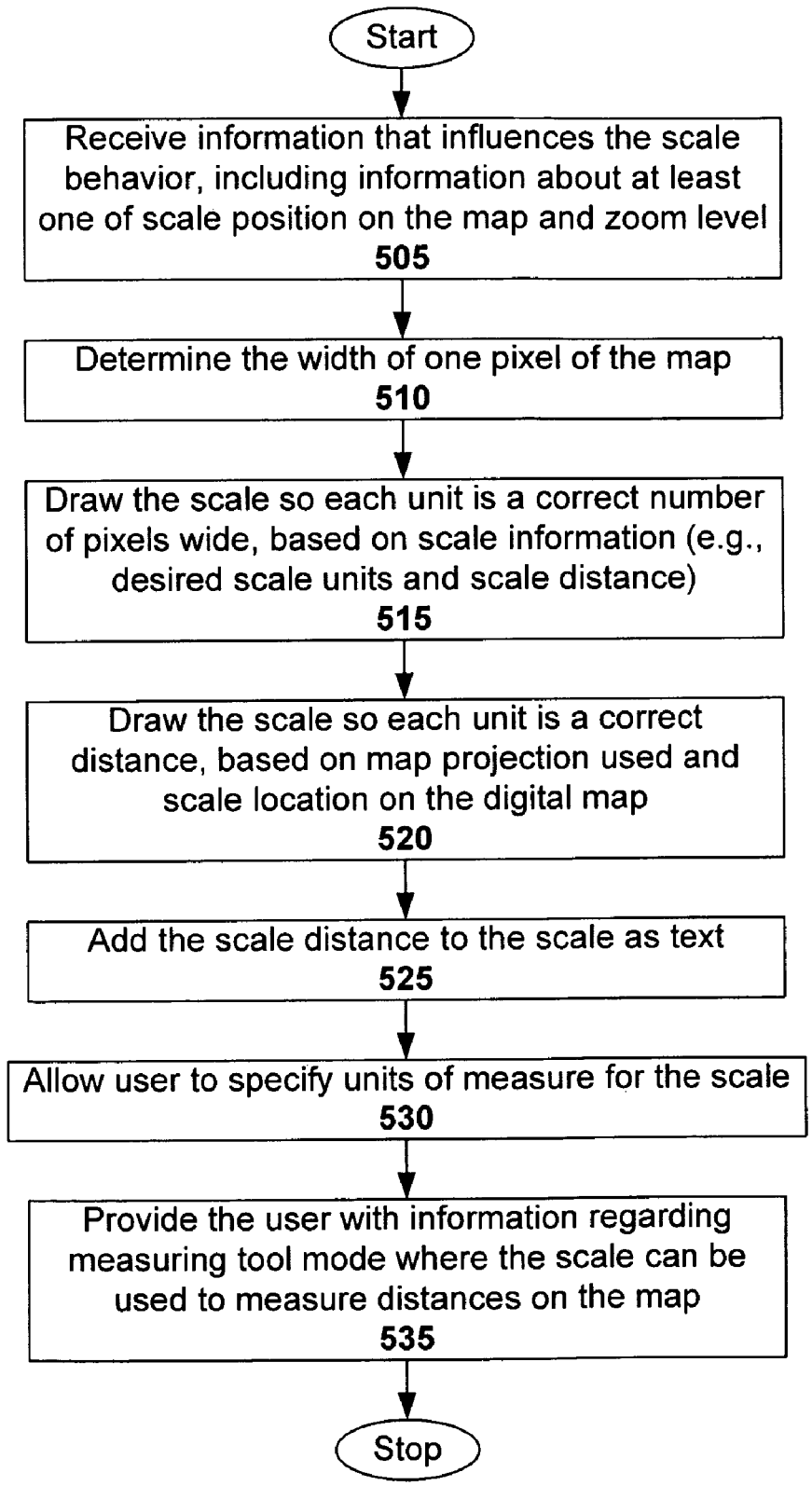
FIG. 5 illustrates a method for dynamically updating, in response to map changes, a combined scale and measuring tool operating in scale mode, in accordance with one embodiment of the present invention.

FIG. 5 illustrates a method for dynamically updating, in response to map changes, a combined scale and measuring tool operating in scale mode, in accordance with one embodiment of the present invention. The method can be carried out, for example, in a digital mapping system that includes a client side that requests map data from a server side (e.g., such as the one shown in FIG. 4). In one particular such case, the method is carried out on the client side. Further note that the method can be encoded as a set of instructions on one or more processor readable mediums (e.g., server, hard disk, or other memory), and carried out by a computer or other processing environment capable of executing those instructions.

The method begins with receiving 505 information that influences the scale behavior, including information about at least one of scale position on the map and zoom level. The information that influences the scale behavior may also identify a map projection (e.g., Mercator) used in making the digital map, and/or information about user preferences, including at least one of desired scale units and desired scale distance. The method continues with determining 510 the width of one pixel of the map. In one such embodiment, the pixel width is determined using a pixelWidth function, based on latitude, longitude, zoom level, and scale units. For example, assume a scale of fixed length (e.g., 200 pixels), and convert the pixel at each end of the scale to a latitude/longitude, using the current map position, and zoom level (e.g., as described in the previously incorporated U.S. application Ser. No. 11/051,534). Each of these is then converted to radians (deg*pi/180). Then, calculate the angular distance between the points: 2*asin(sqrt((sin((lat1−lat2)/2))^+cos(lat1)*cos(lat2)*(sin(lon1−lon2)/2))^2)). This result is then converted to an actual arc length by multiplying it with the radius of the earth in meters (e.g., 6378137*angular distance, where "6378137" is used as an approximation of the earth's radius). The result can then be scaled back to get meters (or other suitable units) per pixel.

The method continues with drawing 515 the scale so each unit is a correct number of pixels wide, based on scale information (e.g., desired scale units and scale distance), and drawing 520 the scale so each unit is a correct distance, based on map projection used and scale location on the digital map (e.g., which could be at the of center of the map by default). Conventional digital map drawing techniques can be used. The method further includes adding 525 the scale distance to the scale as text, and allowing 530 a user to specify units (e.g., metric or imperial) of measure for the scale. The method continues with providing 535 the user with information regarding measuring tool mode (e.g., tool tips and use instructions), where the scale can be used to measure distances on the map.

Figure 6:
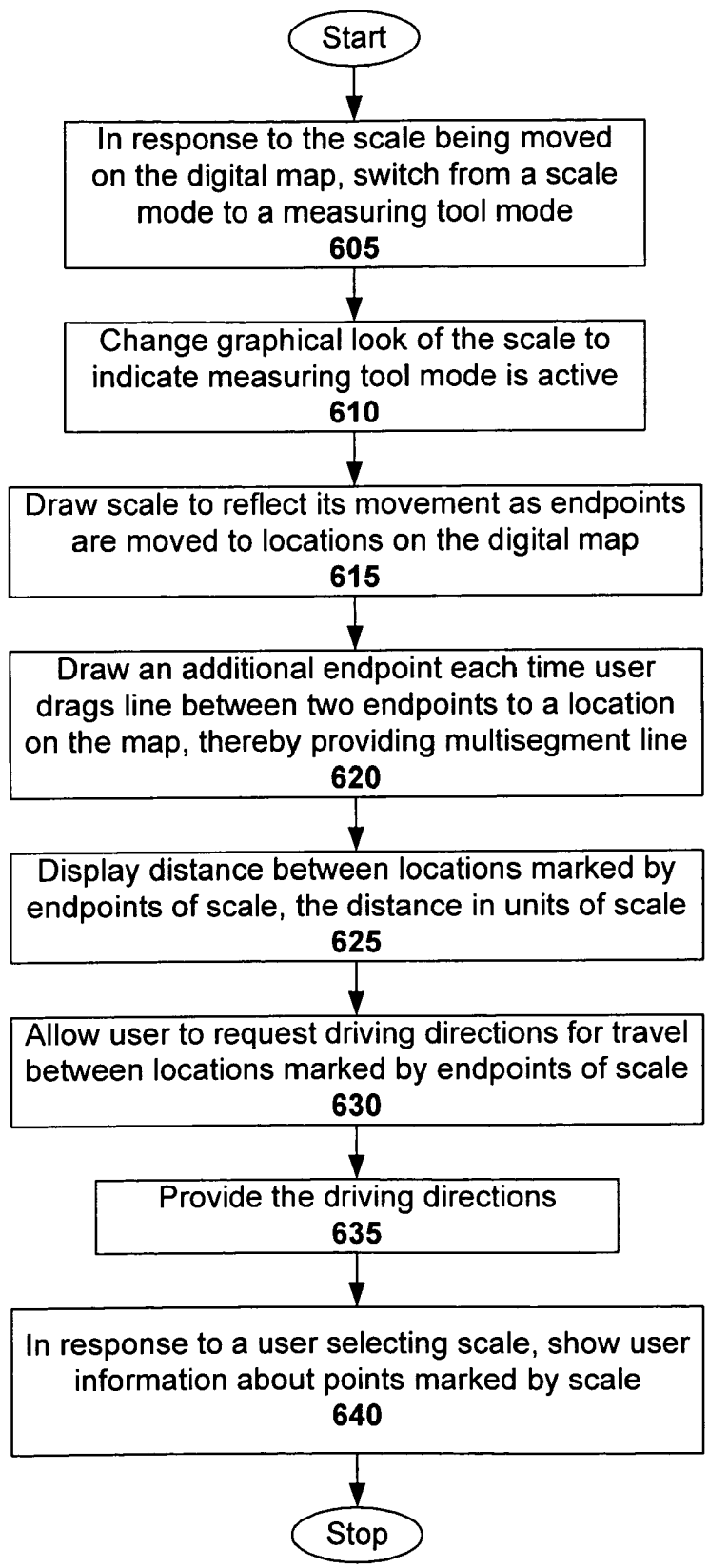
FIG. 6 illustrates a method for dynamically updating, in response to user input, a combined scale and measuring tool operating in tool mode, in accordance with one embodiment of the present invention.

FIG. 6 illustrates a method for dynamically updating, in response to user input, a combined scale and measuring tool operating in tool mode, in accordance with one embodiment of the present invention. Just as with the method of FIG. 5, this method can be carried out, for example, on the client side of a digital mapping system, and can be encoded as a set of instructions on a processor readable medium, and carried out by a processing environment (e.g., browser enabled computer) capable of executing those instructions.

In response to the scale being moved on the digital map, the method begins with switching 605 from a scale mode to a measuring tool mode, and changing 610 the graphical look of the scale to indicate measuring tool mode is active. As previously discussed, this may include, for example, changing the look of the endpoints from circles to teardrop shaped location markers.

The method continues with drawing 615 the scale to reflect its movement as the endpoints are moved to locations on the digital map. The method continues with drawing 620 an additional endpoint each time user drags line between two endpoints to a location on the map, thereby providing a multi-segment line, and displaying 625 the distance between locations marked by endpoints of scale, the distance in units of scale. The drawing can be carried out, for example, using conventional drawing techniques (e.g., using JavaScript code), and the display can be provided in an information window, as described in U.S. application Ser. No. 11/051,534.

The method continues with allowing 630 the user to request driving directions for travel between locations marked by endpoints of scale (whether a single line or a multisegment line), and providing 635 the driving directions. In response to a user selecting the scale, the method further includes showing 640 user information about points marked by scale (e.g., using an information window, as described in U.S. application Ser. No. 11/051,534).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer implemented method for adjusting and using a graphical map scale of a digital map, the map scale having units, provided by a digital mapping system, the method comprising the steps of:

in response to the digital map being moved or zoomed, updating the scale; and in response to the scale being moved on the digital map, switching from a scale mode to a measuring tool mode.

2. The method of claim 1 further comprising the preliminary step of:

receiving information that influences behavior of the scale, including information about at least one of scale position on the map and zoom level.

3. The method of claim 2 wherein the information that influences the behavior of the scale further identifies a map projection used in making the digital map.

4. The method of claim 2 wherein the information that influences the behavior of the scale further includes information about user preferences, including at least one of desired scale units and desired scale distance.

5. The method of claim 1 wherein updating the scale comprises the steps of:

determining a width of the scale in number of pixels based on scale units and scale distance; and adding the scale distance to the scale as text.

6. The method of claim 1 wherein updating the scale comprises the steps of:

determining a distance represented by the scale unit based on map projection used and scale location on the digital map; and adding the distance to the scale as text.

7. The method of claim 1 wherein switching from scale mode to measuring tool mode includes changing a graphical appearance of the scale to indicate that the measuring tool mode is active.

8. The method of claim 1 wherein in the scale mode, the method further comprises the steps of:
  generating a tool tip in response to a user moving a cursor over the scale, the tool tip indicating availability of the measuring tool mode.

9. The method of claim 1 wherein in the scale mode, the method further comprises at least one of the steps of:
  opening an information window in response to a user selecting the scale, the information window configured to receive a specification of units of measure for the scale; and
  opening an information window in response to a user selecting the scale, the information window configured to display information describing how to use the scale as a measuring tool to measure distances on the map.

10. The method of claim 1 wherein in the measuring tool mode, the method further comprises the steps of:
  indicating a home position for the scale on or proximate the digital map; and
  in response to a user selecting the home position:
    switching from the measuring tool mode to the scale mode; and
    returning the scale to the home position.

11. The method of claim 1 wherein in the measuring tool mode, the method further comprises the step of:
  displaying a distance between locations marked by endpoints of the scale, the distance in units of the scale.

12. The method of claim 1 wherein in the measuring tool mode, the method further comprises the steps of:
  opening an information window in response to a user selecting the scale, the information window configured to receive a request for driving directions for travel between locations marked by endpoints of the scale; and providing the driving directions.

13. The method of claim 1 wherein in the measuring tool mode, the method further comprises the step of:
  opening an information window in response to a user selecting the scale, the information window configured to display information about points marked by the scale.

14. The method of claim 1 wherein the digital mapping system includes a client side that requests map data from a server side, and the method is carried out on the client side.

15. A computer implemented method for adjusting and using a graphical map scale of a digital map provided by a digital mapping system, the method comprising the steps of:
  in response to the scale being moved on the digital map, switching from a scale mode to a measuring tool mode and changing a graphical appearance of the scale to indicate that the measuring tool mode is active; and
  displaying a distance between locations marked by endpoints of the scale, the distance in units of the scale.

16. The method of claim 15 wherein the scale includes a line between two endpoints, and in the measuring tool mode, the method further comprises the step of:
  drawing the scale to reflect its movement as the endpoints are moved to locations on the digital map.

17. The method of claim 16 wherein drawing the scale to reflect its movement further comprises the steps of:
  changing a graphical appearance of at least one of the endpoints of the scale to indicate its movement; and
  changing the graphical appearance of the at least one endpoint to indicate it has been released from movement.

18. The method of claim 15 wherein in the measuring tool mode, the method further comprises the steps of:
  opening an information window in response to a user selecting the scale, the information window configured to receive a request for driving directions for travel between locations marked by endpoints of the scale; and providing the driving directions.

19. The method of claim 15 wherein the scale includes a line between the two endpoints, and in measuring tool mode, the method further comprises the step of:
  in response to a user dragging a point on the line between the two endpoints, drawing an additional point on the line, thereby providing a multisegment line.

20. The method of claim 19 further comprising the step of:
  converting the multisegment line into at least one of written and graphical driving directions.

21. The method of claim 15 wherein in the measuring tool mode, the method further comprises the step of:
  opening an information window in response to a user selecting the scale, the information window configured to display information about points marked by the scale.

22. The method of claim 15 wherein in the measuring tool mode, the method further comprises the steps of:
  indicating a home position for the scale on or proximate the digital map; and
  in response to a user selecting the home position:
    switching from the measuring tool mode to the scale mode; and
    returning the scale to the home position.

23. The method of claim 15 wherein the digital mapping system includes a client side that requests map data from a server side, and the method is carried out on the client side.

24. The method of claim 15 wherein the digital mapping system is a tile-based mapping system.

25. A computer implemented method for adjusting and using a graphical map scale of a digital map provided by a digital mapping system, the method comprising the steps of:
  in response to the scale being moved on the digital map, switching from a scale mode to a measuring tool mode;
  drawing the scale to reflect its movement on the digital map, the scale including a line between two endpoints;
  changing the graphical appearance of the scale to indicate it is no longer moving; and
  displaying a distance between locations marked by the endpoints of the scale, the distance in units of the scale.

26. The method of claim 25 wherein in the measuring tool mode, the method further comprises the steps of:
  opening an information window in response to a user selecting the scale, the information window configured to receive a request for driving directions for travel between locations marked by endpoints of the scale; and providing the driving directions.

27. The method of claim 25 wherein in the measuring tool mode, the method further comprises the steps of:
  in response to a user dragging a point on the line between the two endpoints, drawing an additional point on the line, thereby providing a multisegment line; and
  opening an information window in response to a user selecting the scale, the information window configured to display information about points marked by the scale.

28. The method of claim 25 wherein the digital mapping system includes a client side that requests map data from a sewer side, and the method is carried out on the client side.

29. The method of claim 25 wherein the digital mapping system is a tile-based mapping system.

30. A computer implemented method for adjusting and using a graphical map scale of a digital map provided by a digital mapping system, the scale having two endpoints and an indication of units between the end points, the method comprising the steps of:

in response to the scale being moved on the digital map, switching from a scale mode to a measuring tool mode;

displaying a distance between locations on the digital map marked by the endpoints of the map scale, the distance in units of the graphical map scale; and responsive to a user dragging a point on a line between the endpoints of the graphical map scale in measuring tool mode, drawing an additional point on the line, thereby providing a multisegment line.

31. The method of claim 30 wherein switching from the scale mode to the measuring tool mode comprises changing a graphical appearance of the scale to indicate that the measuring tool mode is active.

32. The method of claim 30 wherein in the measuring tool mode, the method further comprises the step of:
drawing the scale to reflect its movement as the endpoints are moved to locations on the digital map.

33. The method of claim 32 wherein drawing the scale to reflect its movement further comprises the steps of:
changing a graphical appearance of at least one of the endpoints of the scale to indicate its movement; and
changing the graphical appearance of the at least one endpoint to indicate it has been released from movement.

34. The method of claim 30 wherein in the measuring tool mode, the method further comprises the steps of:
opening an information window in response to a user selecting the scale, the information window configured to receive a request for driving directions for travel between locations marked by endpoints of the scale; and
providing the driving directions.

35. The method of claim 30 further comprising the step of:
converting the multisegment line into at least one of written and graphical driving directions.

36. The method of claim 30 wherein in the measuring tool mode, the method further comprises the step of:
opening an information window in response to a user selecting the scale, the information window configured to display information about points marked by the scale.

37. The method of claim 30 wherein in the measuring tool mode, the method further comprises the steps of:
indicating a home position for the scale on or proximate the digital map; and
in response to a user selecting the home position:
switching from the measuring tool mode to the scale mode; and
returning the scale to the home position.

38. The method of claim 30 wherein the digital mapping system includes a client side that requests map data from a server side, and the method is carried out on the client side.

39. The method of claim 30 wherein the digital mapping system is a tile-based mapping system.

40. A computer-implemented system, including a processor and memory, for adjusting and using a graphical map scale of a digital map, the map scale having units, wherein the processor is configured to:
in response to the digital map being moved or zoomed, update the scale; and
in response to the scale being moved on the digital map, switch from a scale mode to a measuring tool mode.

41. The system of claim 40 wherein the processor is further configured to:
receive information that influences behavior of the scale, including information about at least one of scale position on the map and zoom level.

42. The system of claim 40 wherein the processor configured to update the scale comprises the processor configured to:
determine a width of the scale in number of pixels based on scale units and scale distance; and
add the scale distance to the scale as text.

43. The system of claim 40 wherein the processor configured to update the scale comprises the processor configured to:
determine a distance represented by the scale unit based on map projection used and scale location on the digital map; and
add the distance to the scale as text.

44. The system of claim 40 wherein the processor configured to switch from scale mode to measuring tool mode comprises the processor configured to change a graphical appearance of the scale to indicate that the measuring tool mode is active.

45. The system of claim 40 wherein in the scale mode, the processor is further configured to generate a tool tip in response to a user moving a cursor over the scale, the tool tip indicating availability of the measuring tool mode.

46. The system of claim 40 wherein in the scale mode, the processor is further configured to open an information window in response to a user selecting the scale, the information window configured to receive a specification of units of measure for the scale.

47. The system of claim 40 wherein in the scale mode, the processor is further configured to open an information window in response to a user selecting the scale, the information window configured to display information describing how to use the scale as a measuring tool to measure distances on the map.

48. The system of claim 40 wherein in the measuring tool mode, the processor is further configured to:
indicate a home position for the scale on or proximate the digital map; and
in response to a user selecting the home position:
switch from the measuring tool mode to the scale mode; and
return the scale to the home position.

49. The system of claim 40 wherein in the measuring tool mode, the processor is further configured to display a distance between locations marked by endpoints of the scale, the distance in units of the scale.

50. The system of claim 40 wherein in the measuring tool mode, the processor is further configured to:
open an information window in response to a user selecting the scale, the information window configured to receive a request for driving directions for travel between locations marked by endpoints of the scale; and
provide the driving directions.

51. The system of claim 40 wherein in the measuring tool mode, the processor is further configured to open an information window in response to a user selecting the scale, the information window configured to display information about points marked by the scale.

52. The system of claim 40 wherein the processor is configured to request map data from a remotely located map server.

53. A computer program product, comprising:
a computer usable medium having computer readable program code embodied therein to adjust and use and a geographical map scale of a digital map, the map scale having units, provided by a digital mapping system the computer readable program code in the computer program product including:
computer readable program code to, in response to the digital map being moved or zoomed, update the scale; and computer readable program code to, in response to the scale being moved on the digital map, switch from a scale mode to a measuring tool mode.

54. The computer program product of claim 53 further comprising computer readable program code to receive information that influences behavior of the scale, including information about at least one of scale position on the map and zoom level.

55. The computer program product of claim 53 wherein the computer readable program code to update the scale comprises:
   computer readable program code to determine a width of the scale in number of pixels based on scale units and scale distance; and
   computer readable program code to add the scale distance to the scale as text.

56. The computer program product of claim 53 wherein the computer readable program code to update the scale comprises:
   computer readable program code to determine a distance represented by the scale unit based on map projection used and scale location on the digital map; and
   computer readable program code to add the distance to the scale as text.

57. The computer program product of claim 53 wherein the computer readable program code to switch from scale mode to measuring tool mode comprises computer readable program code to change a graphical appearance of the scale to indicate that the measuring tool mode is active.

58. The computer program product of claim 53 wherein in the scale mode, further comprising computer readable program code to generate a tool tip in response to a user moving a cursor over the scale, the tool tip indicating availability of the measuring tool mode.

59. The computer program product of claim 53 wherein in the scale mode, further comprising computer readable program code to open an information window in response to a user selecting the scale, the information window configured to receive a specification of units of measure for the scale.

60. The computer program product of claim 53 wherein in the scale mode, further comprising computer readable program code to open an information window in response to a user selecting the scale, the information window configured to display information describing how to use the scale as a measuring tool to measure distances on the map.

61. The computer program product of claim 53 wherein in the measuring tool mode, further comprising:
   computer readable program code to indicate a home position for the scale on or proximate the digital map; and
   computer readable program code to in response to a user selecting the home position:
      switch from the measuring tool mode to the scale mode; and
      return the scale to the home position.

62. The computer program product of claim 53 wherein in the measuring tool mode, further comprising computer readable program code to display a distance between locations marked by endpoints of the scale, the distance in units of the scale.

63. The computer program product of claim 53 wherein in the measuring tool mode, further comprising:
   computer readable program code to open an information window in response to a user selecting the scale, the information window configured to receive a request for driving directions for travel between locations marked by endpoints of the scale; and
   computer readable program code to provide the driving directions.

64. The computer program product of claim 53 wherein in the measuring tool mode, further comprising computer readable program code to open an information window in response to a user selecting the scale, the information window configured to display information about points marked by the scale.

65. The computer program product of claim 53 further comprising computer readable program code to request map data from a remotely located map server.

* * * * *

UNITED STATES PATENT AND TRADEMARK OFFICE
CERTIFICATE OF CORRECTION

| | | |
|---|---|---|
| PATENT NO. | : 7,620,496 B2 | Page 1 of 1 |
| APPLICATION NO. | : 11/181016 | |
| DATED | : November 17, 2009 | |
| INVENTOR(S) | : Jens Eilstrup Rasmussen | |

It is certified that error appears in the above-identified patent and that said Letters Patent is hereby corrected as shown below:

Title Pg, (*) Notice: Delete "681 days" and insert --1162 days--.

In claim 28, Column 16, line 60, replace "sewer" with --server--.

Signed and Sealed this

Thirty-first Day of August, 2010

David J. Kappos
*Director of the United States Patent and Trademark Office*